US012757919B2

(12) United States Patent
Ratz et al.

(10) Patent No.: US 12,757,919 B2
(45) Date of Patent: Oct. 13, 2026

(54) FLAVOR COMPOSITIONS CONTAINING IRON COMPOUNDS AND THEIR USE

(71) Applicant: Firmenich SA, Satigny (CH)

(72) Inventors: Antje Ratz, Vienna (AT); Jian Zhang, Plainsboro, NJ (US)

(73) Assignee: FIRMENICH SA, Satigny (CH)

( * ) Notice: Subject to any disclaimer, the term of this patent is extended or adjusted under 35 U.S.C. 154(b) by 192 days.

(21) Appl. No.: 18/293,186

(22) PCT Filed: Sep. 23, 2022

(86) PCT No.: PCT/EP2022/076554
§ 371 (c)(1),
(2) Date: Jan. 29, 2024

(87) PCT Pub. No.: WO2023/046914
PCT Pub. Date: Mar. 30, 2023

(65) Prior Publication Data

US 2024/0358050 A1 Oct. 31, 2024

Related U.S. Application Data

(60) Provisional application No. 63/248,703, filed on Sep. 27, 2021.

(30) Foreign Application Priority Data

Nov. 5, 2021 (EP) .................................... 21206772

(51) Int. Cl.
*A23D 9/007* (2006.01)
*A23J 3/22* (2006.01)
*A23L 27/26* (2016.01)

(52) U.S. Cl.
CPC .............. *A23L 27/26* (2016.08); *A23D 9/007* (2013.01); *A23J 3/227* (2013.01)

(58) Field of Classification Search
CPC ........... A23J 2/227; A23J 3/227; A23L 27/26; A23D 9/007
See application file for complete search history.

(56) References Cited

U.S. PATENT DOCUMENTS 6,468,576 B1 10/2002 Sher
8,076,491 B2 12/2011 Karanewsky
8,124,121 B2 2/2012 Tachdjian
8,445,692 B2 5/2013 Karanewsky
8,541,421 B2 9/2013 Tachdjian
8,592,592 B2 11/2013 Tachdjian
8,735,081 B2 5/2014 Li
8,815,956 B2 8/2014 Tachdjian
8,877,922 B2 11/2014 Tachdjian
8,968,708 B2 3/2015 Tachdjian
9,000,051 B2 4/2015 Feltin
9,000,054 B2 4/2015 Tachdjian
9,247,759 B2 2/2016 Karanewsky
9,394,287 B2 7/2016 Priest
9,834,544 B2 12/2017 Tachdjian
10,421,727 B2 9/2019 Chumakova
2011/0039002 A1* 2/2011 Verkoeijen ............ A23D 7/011 426/601
2014/0205729 A1 7/2014 Didzbalis
2017/0119032 A1 5/2017 Patron
2017/0188612 A1* 7/2017 Varadan ................ A23L 13/422
2017/0298337 A1 10/2017 Kale
2017/0321203 A1 11/2017 Kale
2017/0321204 A1 11/2017 Kale
2019/0200658 A1 7/2019 Vrljic
2022/0167642 A1 6/2022 Erni et al.

FOREIGN PATENT DOCUMENTS

WO WO 2013/010042 1/2013
WO WO 2014/110532 7/2014
WO WO 2014/110539 7/2014
WO WO 2015/153666 10/2015
WO WO 2020/260628 12/2020
WO WO 2021/104846 6/2021

OTHER PUBLICATIONS

Int'l Search Report & Written Opinion of Int'l Search Authority for PCT App. No. PCT/EP2022/076554, dated Jan. 18, 2023.
Arctander, 1969, Perfume and Flavor Chemicals, Montclair, NJ (TOC).
Fischer et al., 2011, Rheology of Food Materials, Current Opinion in Colloid & Interface Science, 16(1):36-40.
Furia et al., eds., Fenaroli's Handbook of Flavor Ingredients, CRC Press, Cleveland, OH (TOC).
Griffin, 1949, Classification of surface-active agents by "HLB", J. Cosmet. Chem., 1:311-326.
Hunter, 1993, Introduction to Modern Colloid Science, Oxford University Press (TOC).
Jacobs, 1947, Synthetic Food Adjuncts, D. Van Nostrand Company, Inc., New York (TOC).
Prosky et al., 1988, Determination of insoluble, soluble, and total dietary fiber in foods and food products: interlaboratory study, J. Assoc. Off. Anal. Chem., 70(5):1017-1023.
Reedy et al., 2008, Development of a Heme Protein Structure-Electrochemical Function Database, Nucleic Acids Research, 36:D307-D313.

* cited by examiner

*Primary Examiner* — Jenna A Watts
(74) *Attorney, Agent, or Firm* — Knobbe, Martens, Olson & Bear, LLP

(57) ABSTRACT

The present disclosure relates generally to flavor compositions that contain iron compounds, such as heme analogues and iron salts. In some embodiments, the flavor compositions comprise a solid plant-based fat. In certain aspects, the disclosure provides uses of such flavor compositions to flavor food products that contain non-animal proteins, such as meat analogue products.

14 Claims, No Drawings

FLAVOR COMPOSITIONS CONTAINING IRON COMPOUNDS AND THEIR USE

TECHNICAL FIELD

The present disclosure relates generally to flavor compositions that contain iron compounds, such as heme analogues and iron salts. In some embodiments, the flavor compositions comprise a solid plant-based fat. In certain aspects, the disclosure provides uses of such flavor compositions to flavor food products that contain non-animal proteins, such as meat analogue products.

DESCRIPTION OF RELATED ART

The human diet generally contains a combination of animal-derived and non-animal-derived products. One of the most common animal-derived products consumer by humans is meat. Meat is often characterized according to color, such as red meat or white meat. In general, red meats tend to contain relatively higher concentrations of iron-containing proteins, such as myoglobin.

Red meats, such as beef and lamb, are commonly consumed by humans around the globe. Such meats have a savory taste that is enhanced by the presence of the iron-containing proteins in such meats. But in recent years, concerns have begun to develop in connection with the consumption of red meat. One such concern is a sustainability concern. Raising cattle, in particular, requires large amounts of grain or grass to use as feed. It requires many times more acres of land to grow the grass or grain to feed cattle than it would to grow plants for direct human consumption. Thus, as the population continues to increase, the demand for increasing agricultural space becomes steadily unsustainable. Moreover, red meats can be high in certain saturated fats and other compounds that increase the risk of cardiovascular disease. Eating elevated amounts of red meat has also been associated with increased risk of certain cancers.

Thus, there is increasing demand to replace red meat in the human diet with similar plant-derived materials. In many cases, because consumers have become accustomed to consuming red meat, these plant-based foods are designed to simulate the flavor, texture, and culinary experience of consuming red meat. Creating such meat analogue materials poses a number of challenges, as one attempts to use plant-derived materials to create a food product that reminds the consumer of the experience of eating meat. One such challenge involves simulating the taste imparted by the iron-based proteins in meat with plant-based alternatives. Legumes, such as peas, lentils, and soybeans, contain iron, but at much lower concentrations than in meats, such as beef or lamb. Thus, without supplementing meat analogue products with iron compounds, it can be challenging to match the flavor imparted by iron-containing compounds found in red meat.

Non-animal-derived iron-containing food additives can be used in certain instances. Examples of some such compounds are set forth in PCT Publication Nos. WO 2013/010042, WO 2014/110532, WO 2014/110539, and WO 2015/153666, each of which is hereby incorporated by reference as though set forth herein in its entirety. But merely including such compounds in food products does not typically deliver the desired taste profile. That is because the chemical-physical characteristics of a meat product, such as a ground beef patty, can be quite different from those of a meat analogue product. Meat analogue products are often complex engineered products that include a combination of flavor-delivery technologies that work in synergy. When such products are not developed with an eye towards including iron-based flavor additives, the benefits of including such compounds in the meat analogue may not be captured fully.

Thus, there is an increasing need to develop delivery systems suitable for the delivery of iron-containing flavoring compounds in meat analogue products.

SUMMARY

The present disclosure relates to the discovery that certain delivery technologies can be beneficially employed to deliver iron-containing flavor ingredients in meat analogue products, such as products designed to simulate a ground beef patty.

In a first aspect, the disclosure provides a comestible composition, which comprises (a) a plurality of oleaginous particles, wherein the oleaginous particles comprise (i) a non-animal fat, a non-animal free fatty acid, or a combination thereof, and (ii) and a flavor oil; and (b) a heme-containing protein or an iron salt. In some embodiments, the comestible composition comprises a non-animal protein, such as a plant protein, for example, pea protein. In some embodiments, the comestible composition comprises one or more plant extracts, such as beet extract, cucumber extract, and the like. In some embodiments, the comestible composition comprises one or more fibers, such as plant fibers, for example, pea fiber, citrus fiber, and the like. In some embodiments, the comestible composition comprises a carrier. In some such embodiments, the carrier is an emulsion, such as a water-in-oil emulsion.

In a second aspect, the disclosure provides a flavored product, which comprises the comestible composition of the first aspect. In some embodiments, the flavored product is a food product, such as a meat analogue product, for example, a non-animal-based ground beef replica. In some other embodiments, the flavored product is an animal feed product, such as pet food product. In such flavored products, the comestible composition can, in some embodiments, be used in combination with animal-based products to reduce the degree of animal fats or animal products in the comestible product. In other embodiments, the flavored products contain no animal-based products, such that the comestible composition is used to make an analogue or a replica of a meat product, such as a ground beef patty.

Further aspects, and embodiments thereof, are set forth below in the Detailed Description, the Abstract, and the Claims.

DETAILED DESCRIPTION

The following Detailed Description sets forth various aspects and embodiments provided herein. The description is to be read from the perspective of the person of ordinary skill in the relevant art. Therefore, information that is well known to such ordinarily skilled artisans is not necessarily included.

Definitions

The following terms and phrases have the meanings indicated below, unless otherwise provided herein. This disclosure may employ other terms and phrases not expressly defined herein. Such other terms and phrases have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "optionally" means that the subsequently described event(s) may or may not occur. In some embodiments, the optional event does not occur. In some other embodiments, the optional event does occur one or more times.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

Unless specified otherwise, numerical ranges expressed in the format "from x to y" are understood to include x and y. When for a specific feature multiple preferred ranges are described in the format "from x to y", it is understood that all ranges combining the different endpoints are also contemplated.

The term "fat" used in the present disclosure refers to lipid components that are solid or in the form of a paste at 20° C. whereas the term "oil" used in the present disclosure refers to lipid components that are liquid at 20° C.

The term "emulsion", as used herein, denotes a mixture of two or more liquids that are normally immiscible (i.e. not mixable). In an emulsion, one liquid (the dispersed phase) is dispersed in the other (the continuous phase). In the present disclosure, it is described an oil-in water emulsions comprising a continuous hydrophilic phase comprising water, in which the hydrophobic phase is dispersed.

The melting profile can be measured by differential scanning calorimeter Q2000 (TA Instruments, New Castle, DE, USA). Typically, small samples (5~10 mg) are sealed in hermetic aluminum pans (Tzero, T161003). Typically, the program consists of the following steps: equilibrate at −20° C. for 5 minutes, ramp to 100° C. at 10° C./min, cooling to −20° C., hold isothermal at −20° C. for 5 min and ramp to 100° C. at 10° C./min. The instrument was calibrated for the melting temperature and enthalpy of fusion of Indium (Standard Reference Material 2232, National Institute of Standards and Technology, Gaithersburg, MD). DSC is widely used to determine percent of fat melted at a certain temperature. This technique is based on measuring the heat of fusion successively at different temperatures. The melting peak temperature and enthalpy of fusion can be obtained using "integrate peak linear" for each DSC curve. The melting peak temperature is the peak temperature of the phase transition curve via DSC. By reference to the total melting heat, the fraction of fat melted is determined. The method is described in "Cassel R B. Determining percent solid in an edible fat. TA Instruments Applications Brief TA290. 2002". The melting profile is taken from the first heating ramp (scan) of the DSC curve at 10° C./min. The percentage of the solid lipid melted as a function of temperature can be calculated using 'running integral'. $T_m$ represents melting peak temperature, $T_{50\%}$ represents the temperature at which 50% by weight of solid lipid melts, $T_{95\%}$ represents the temperature at which 95% by weight of solid lipid melts.

In case of combination of more than two components, the melting profile of the mixture can be obtained by the same method as described previously.

By "melting temperature $T_{50\%}$", it is meant the temperature at which 50% by weight of plant-based fat melts.

By "melting temperature $T_{95\%}$", it is meant the temperature at which 95% by weight of plant-based fat melts.

$T_m$, $T_{50\%}$ and $T_{95\%}$ are well-known parameters used by the skilled person in the art. It can be easily determined by DSC (Differential Scanning calorimetry) as described above.

By "plant-based fat", it is meant a compound chosen in the group consisting of glycerides, fatty acids, hydrogenated oils that derived from plants.

By "flavor oil" it is meant here a flavoring ingredient or a mixture of flavoring ingredients.

By "perfume oil" it is meant here a perfuming ingredient or a mixture of perfuming ingredients.

"Emulsifiers" are amphiphilic molecules that concentrate at the interface between two phases and modify the properties of that interface. Examples of emulsifiers can be found in *McCutcheon's Emulsifiers & Detergents or the Industrial Surfactants Handbook.*

Other terms are defined in other portions of this description, even though not included in this subsection.

Oleaginous Particles

The comestible compositions disclosed herein comprise a plurality of oleaginous particles. These particles comprise (i) a non-animal fat, a non-animal free fatty acid, or a combination thereof, and (ii) and a flavor oil.

In some embodiments, the oleaginous particles comprise a non-animal fat. Any suitable non-animal fat can be used in the oleaginous particles, including fats derived from plants, fungi, algae, and any combinations thereof. In some embodiments, the non-animal fat is a plant-derived fat. In some embodiments, the non-animal fat comprises palm oil, palm kernel oil, coconut oil, cocoa butter, fractions of any of the foregoing, or any combinations thereof. As used herein, a "fraction" of an oil is a higher-melting portion of the oil that is separated from other components in the oil, for example, by crystallization. Palm stearin is a common example of such a fraction, which is obtained by the slow crystallization of palm oil and the separation of the higher-melting portion that crystallizes as heated oil is cooled to a temperature near its melting point. Other examples include shea stearin, rice stearin, and the like. Also, note that the term "oil" is used here with reference to these particular plant-based fate because that is the common term for referring to such fats, even though they are solids at 20° C. In some embodiments, the non-animal fat comprises palm oil or a fraction thereof, such as palm stearin. In some embodiments, the non-animal fat comprises coconut oil. In some In some embodiments, the non-animal fat comprises palm kernel oil. In some embodiments, the non-animal fat comprises cocoa butter. In general, the non-animal fat comprises mostly triglycerides. In some embodiments, a minor amount of monoglycerides and diglycerides can be present. For example, in some embodiments, the non-animal fat comprises at least 60% by weight, or at least 70% by weight, or at least 80% by weight, or at least 90% by weight, or at least 95% by weight, triglycerides, based on the total weight of glycerides in the plurality of oleaginous particles.

In some embodiments, the oleaginous particles comprise free fatty acids. In some such embodiments, the free fatty acids are derived from non-animal sources, such as plants, fungi, algae, or any combinations thereof. In some embodiments, the free fatty acids are derived from plants, such as palm, coconut, or cocoa. Non-limiting examples of free fatty acids suitable for use in the plurality of oleaginous particles include capric acid, lauric acid, myristic acid, palmitic acid, stearic acid, oleic acid, linoleic acid, linolenic acid, eicosapentaenoic acid, docosahexaenoic acid, or any combinations thereof. In some embodiments, the free fatty acid is palmitic acid.

In embodiments where a non-animal free fatty acid and a non-animal fat are present in the oleaginous particles, the weight ratio of non-animal fat to non-animal free fatty acid ranges from 1:10 to 10:1, or from 1:6 to 6:1, or from 1:3 to 3:1. In some embodiments, the oleaginous particles comprise non-animal fat and substantially no non-animal free fatty acid. For example, in some such embodiments, no more than 5% by weight, or no more than 3% by weight, or no more than 1% by weight of non-animal fatty acid is present in the oleaginous particles relative to the total amount of non-animal fat and non-animal free fatty acid. In some embodiments, the oleaginous particles comprise non-animal free fatty acid and substantially no non-animal fat. For example, in some such embodiments, no more than 5% by weight, or no more than 3% by weight, or no more than 1% by weight of non-animal fat is present in the oleaginous particles relative to the total amount of non-animal fat and non-animal free fatty acid.

In some embodiments, the oleaginous particles comprise a carrier, for example, a solid carrier. In certain embodiments, the oleaginous particles are prepared by methods such as spray drying or extrusion. In such cases, a solid carrier is present to facilitate the formation of the particles. Any suitable carrier material can be used, such as carrier materials commonly employed in the formation of comestible particles via spray drying or extrusion. In some embodiments, the solid carrier is water soluble. As used in this context, a carrier is "water soluble" if it forms a single-phase solution when dissolved in water at concentrations as high as 20 percent by weight. In some embodiments thereof, the water-soluble carrier forms a single-phase solution when dissolved in water at concentrations as high as 20 percent by weight, or as high as 40 percent by weight, or as high as 50 percent by weight. Some non-limiting examples of water-soluble carriers include: maltodextrin; inulin or chicory fiber; plant-based proteins, such as pea protein; water-soluble flours; gums, such as gum Arabic; soluble fibers; soluble polysaccharides; and combinations thereof.

As used herein, the term "soluble fiber" refers to polysaccharides characterized as being soluble by using the method of the Association of Official Analytical Chemists (AOAC) and as set forth in Prosky et al., J. Assoc. Off. Anal. Chem., vol. 70 (5), pp. 1017-1023 (1988). Any suitable soluble fibers can be used, including, but not limited to, fruit fiber (such as citrus fiber), grain fibers, psyllium husk fiber, natural soluble fibers and synthetic soluble fibers. Natural fibers include soluble corn fiber, maltodextrin, acacia, and hydrolyzed guar gum. Synthetic soluble fibers include polydextrose, modified food starch, and the like. Non-limiting examples of food-grade sources of soluble fiber include inulin, corn fiber, barley fiber, corn germ, ground oat hulls, milled corn bran, derivatives of the aleurone layer of wheat bran, flax flour, whole flaxseed bran, winter barley flake, ground course kilned oat groats, maize, pea fiber (e.g. Canadian yellow pea), Danish potatoes, konjac vegetable fiber (glucomannan), psyllium fiber from seed husks of planago ovate, psyllium husk, liquid agave fiber, rice bran, oat sprout fibers, amaranth sprout, lentil flour, grape seed fiber, apple, blueberry, cranberry, fig fibers, ciranda power, carob powder, milled prune fiber, mango fiber, apple fiber, orange, orange pulp, strawberry, carrageenan hydrocolloid, derivatives of eucheuma cottonnil seaweed, cottonseed, soya, kiwi, acacia gum fiber, bamboo, chia, potato, potato starch, pectin (carbohydrate) fiber, hydrolyzed guar gum, carrot, soy, soybean, chicory root, oat, wheat, tomato, polydextrose fiber, refined corn starch syrup, isomalto-oligosaccharide mixtures, soluble dextrin, mixtures of citrus bioflavonoids, cell-wall broken nutritional yeast, lipophilic fibers, plum juice, derivatives from larch trees, olygose fibers, derivatives from cane sugar, short-chain fructooligosaccharides, synthetic polymers of glucose, polydextrose, pectin, polanion compounds, cellulose fibers, cellulose fibers derived from hard wood plants and carboxymethyl cellulose. In some embodiments, the carrier comprises maltodextrin, gum Arabic, pea protein, inulin, or any combination thereof. In some embodiments, the carrier comprises maltodextrin. In some embodiments, the carrier comprises a modified starch, such as dextrin. In some embodiments, the carrier comprises a mixture of dextrin and maltodextrin.

In some embodiments, the carrier has emulsifying properties. Non-limiting examples include gum Arabic or pea protein In some such embodiments, the oleaginous particle comprises substantially no emulsifier, for example, no more than 3 percent by weight, or no more than 2 percent by weight, or no more than 1 percent by weight, emulsifier, based on the total weight of the oleaginous particle.

The carrier can be present in any suitable amount in the oleaginous particles. In some embodiments, the carrier makes up from 2.5 percent by weight to 50 percent by weight, or from 5 percent by weight to 50 percent by weight, or from 10 percent by weight to 50 percent by weight, or from 15 percent by weight to 50 percent by weight, or from 25 percent by weight to 50 percent by weight, or from 30 percent by weight to 50 percent by weight, or from 30 percent by weight to 40 percent by weight, of the oleaginous particles, based on the total weight of the particles.

In some embodiments, the oleaginous particles comprise an emulsifier. As noted above, some carriers can serve simultaneously as an emulsifier, which can, among other things, assist in the process of forming the oleaginous particles by spray drying. In some embodiments, the emulsifier is a hydrophilic emulsifier, which, for example, can be suitable for spray drying an oil-in-water emulsion. Any suitable such emulsifier can be used. For example, polymeric emulsifiers and small molecule surfactants can be used. In some embodiments, the emulsifier is a plant-based protein, such as pea protein or rice protein, gum Arabic, modified food starch (for example, dextrin), Quillaja saponins, lecithin, or any combinations thereof.

The emulsifier can be present in any suitable amount in the oleaginous particles. In some embodiments, the carrier makes up from 1 percent by weight to 30 percent by weight, or from 2 percent by weight to 30 percent by weight, or from 5 percent by weight to 30 percent by weight, or from 8 percent by weight to 30 percent by weight, or from 8 percent by weight to 20 percent by weight, of the oleaginous particles, based on the total weight of the particles.

The oleaginous particles further comprise one or more flavor oils. The term "flavor oil" means a flavoring ingredient or a mixture of flavoring ingredients, solvents or adjuvants used or the preparation of a flavoring formulation, for example, a particular mixture of ingredients which is intended to be added to an edible composition (including but not limited to a beverage) or chewable product to impart, improve, or modify its organoleptic properties, in particular its flavor or taste. The flavor oil is a liquid at about 20° C. Flavoring ingredient is understood to include a variety of flavor materials of both natural and synthetic origins, including single compounds or mixtures. Many of these flavoring ingredients are listed in reference texts such as S. Arctander, Perfume and Flavour Chemicals (1969), or its more recent versions, or in other works of similar nature such as Fenaroli's Handbook of Flavour Ingredients (1975), or Synthetic Food Adjuncts (1947). Solvents and adjuvants of current use for the preparation of a flavoring formulation are also well known in the industry. These substances are well known to the person skilled in the art of flavoring and/or aromatizing foods and consumer products.

The flavoring ingredient may be a taste modifier or a taste compound.

Examples of taste compounds are salt, inorganic salts, organic acids, sugars, amino acids and their salts, ribonucleotides, and sources thereof.

A "taste modifier" is understood as an active ingredient that operates on a human taste receptors, or provides a sensory characteristic related to mouthfeel (such as body, roundness, or mouth-coating) to a product being consumed. Non-limiting examples of taste modifiers include active ingredients that enhance, modify or impart saltiness, fattiness, umami, kokumi, heat sensation or cooling sensation, sweetness, acidity, tingling, bitterness or sourness.

In some embodiments, the flavoring oil comprises a beef flavor. In some embodiments, the flavoring oil comprises additional components that enhance or impart an umami taste, that enhance or impart a kokumi taste, or that mask or block a bitter taste.

The oleaginous particles can have any suitable physical properties, such as melting properties. In some embodiments, the oleaginous particles have a peak melting temperature greater than 20° C. and less than 70° C. In some embodiments, the oleaginous particles have a $T_{50\%}$ (temperature at which half by weight of the oleaginous particles have melted) of greater than 15° C. and less than 60° C. In some embodiments, the oleaginous particles have a $T_{95\%}$ (temperature at which 95% by weight of the oleaginous particles have melted) of greater than 20° C. and less than 80° C.

The oleaginous particles can have any suitable particle size. In some embodiments, the oleaginous particles have a minimum particle size of at least 10 μm, or at least 20 μm. In some embodiments, the oleaginous particles have an average particle size ranging from 50 μm to 750 μM, or from 50 μm to 500 μm.

The oleaginous particles can be formed by any suitable means, such as by spray drying or extrusion. Such methods are described in PCT Publication WO 2021/104846, which is hereby incorporated by reference as though set forth herein in its entirety.

Liquid Carrier; Water-in-Oil Emulsion

In certain embodiments, the comestible composition comprises a liquid carrier. In some embodiments, the liquid carrier an emulsion comprising a continuous phase and a dispersed phase, wherein the continuous phase comprises a fatty composition, and the dispersed phase comprises an aqueous medium. In some embodiments, the aqueous medium comprises water and, optionally, one or more water-soluble flavor compounds, such as aroma compounds. In some such embodiments, the continuous phase makes up from 30 weight percent to 99 weight percent of the emulsion, and the dispersed phase makes up from 0.1 weight percent to 50 weight percent of the emulsion. In some embodiments, the fatty composition comprises solid fat particles and a liquid oil, wherein the solid fat particles are dispersed within the liquid (edible) oil. In some embodiments thereof, the fatty composition comprises an emulsifier. In some embodiments thereof, the fatty composition comprises one or more fat-soluble flavor compounds, fat-soluble aroma compounds, or combinations thereof. In some embodiments, the weight-to-weight ratio of liquid (edible) oil to solid fat particles ranges from 30:70 to 99:1. In some embodiments where an emulsifier is present, the emulsifier is present in a concentration ranging from 0.2 weight percent to 35 weight percent, based on the total weight of the fatty composition.

In some embodiments, the fat particles comprise plant-derived fats. Suitable such plant-derived fats include cocoa butter, palm fat (i.e., solid palm oil), coconut fat (i.e., solid coconut oil), palm kernel fat (i.e., solid palm kernel oil), hydrogenated vegetable oils, or any combinations thereof. In some embodiments, the plant-derived fats include cocoa butter. In some such embodiments, the fat particles comprise at least 75% by weight, or at least 80% by weight, or at least 85% by weight, or at least 90% by weight, or at least 95% by weight, or at least 97% by weight, or at least 99% by weight, of plant-derived fats, based on the total weight of solid fat particles in the fatty composition.

In some other embodiments, the fat particles comprise animal-derived fats. Suitable such animal derived fats include butter, lard, tallow, or any combination thereof. In some such embodiments, the fat particles comprise no more than 25% by weight, or no more than 20% by weight, or no more than 15% by weight, or no more than 10% by weight, or no more than 5% by weight, or no more than 3% by weight, or no more than 1% by weight, of animal-derived fats, based on the total weight of solid fat particles in the fatty composition.

In general, the fats that make up the solid fat particles are triglycerides, but may include certain amounts of diglycerides or monoglycerides. Note, as used herein, the term "fat" refers to fatty acid glycerides, which are in a solid state at a given temperature, such as room temperature (22° C.). The fats that make up the solid fat particles comprise at least 75% by weight, or at least 80% by weight, or at least 85% by weight, or at least 90% by weight, or at least 95% by weight, or at least 97% by weight, of triglycerides, based on the total weight of fatty acid glycerides in the solid fat particles. The fatty acids that make up the fatty acid glycerides in the solid fat particles can be any suitable mixture of saturated and unsaturated fatty acids. In some embodiments, the fats that make up the solid fatty particles have an iodine number ranging from 1 to 75, or from 2 to 65, or from 5 to 55.

The solid fat particles can have any suitable melting point. In some embodiments, the solid fat particles have a melting point of at least 30° C., or at least 35° C., or at least 40° C. In some further embodiments, the solid fat particles have a melting point of no more than 80° C.

In some embodiments, the solid fat particles comprise an edible wax. Non-limiting examples of edible waxes include hydrogenated soy fat, palm fat, coconut fat, cocoa butter, carnauba wax, rice bran wax, shea butter, and mixture thereof. In some embodiments, the edible wax is an animal fat having higher melting point fat fractions such as palm or shea olein and mixtures thereof.

As noted above, the fatty composition also comprises a liquid (edible) oil into which the solid fat particles are dispersed. Any suitable can be used, so long as the oil is generally a liquid at room temperature (e.g., 22° C.), such as an animal oil, a fish oil, a vegetable oil, an algal oil, or any combination thereof. In some embodiments, the liquid oil is a plant-derived oil. In some other embodiments, the oil is not a plant-derived oil. Examples of liquid oils include sunflower oil, rapeseed or canola oil, soybean oil, palm oil, coconut oil, groundnut (peanut) oil, palm kernel oil, olive oil, cottonseed oil, sesame oil, linseed oil, an algal oil, a marine oil, avocado oil, argan oil, and any mixtures thereof. In some embodiments, the liquid oil comprises medium chain triglyceride oil (MCT) oil, soybean oil, cottonseed oil, peanut oil, sesame oil, corn oil, sunflower oil, canola oil, safflower oil, avocado oil, olive oil, argan oil, or any mixtures thereof.

In general, the liquid oil and the solid fatty particles will have a difference in their melting point. In general, the liquid oil will have a melting point of no more than 25° C., or no more than 20° C., or no more than 15° C., or no more than 10° C., or no more than 8° C., or no more than 5° C.

In some embodiments, the difference in melting between the higher melting point of the solid fat particles and the lower melting points of the liquid oil ranges from 5° C. to 105° C., or from 8° C. to 90° C., or from 10° C. to 80° C., or from 12° C. to 70° C., or from 15° C. to 60° C.

The solid fat particles and the liquid oil can be present in the fatty composition in any suitable relative amounts, so long as there is enough liquid oil to disperse the solid fatty particles at around room temperature. In some embodiments, weight ratio of liquid oil to solid fat particles in the fatty composition ranges from 30:70 to 99:1, or from 40:60 to 98:2, or from 55:45 to 97:3, or from 60:40 to 95:5, or from 70:30 to 93:7, or from 72:28 to 92:8.

In some embodiments, it may be desirable that the fatty composition be substantially free of animal fats or oils. Thus, in some embodiments, the fatty composition comprises no more than 5% by weight, or no more than 3% by weight, or no more than 1% by weight, or no more than 0.5% by weight, or no more than 0.3% by weight, or no more than 0.1% by weight, of animal-derived fats or oils, based on the total weight of the fatty composition.

In some embodiments, it may be desirable that the fatty composition be substantially free of fats or oils derived from genetically modified plants (GMO-derived fats or oils). Thus, in some embodiments, the fatty composition comprises no more than 5% by weight, or no more than 3% by weight, or no more than 1% by weight, or no more than 0.5% by weight, or no more than 0.3% by weight, or no more than 0.1% by weight, of GMO-derived fats or oils, based on the total weight of the fatty composition.

In some embodiments, the fatty composition comprises an emulsifier. When present, the emulsifier can be present at any suitable concentration. In some embodiments, the concentration of emulsifier in the fatty composition ranges from 0.2% by weight to 35% by weight, or from 0.3% by weight to 20% by weight, or from 0.4% by weight to 15% by weight, or from 0.5% by weight to 10% by weight, or from 0.6% by weight to 8% by weight, of emulsifier, based on the total weight of the fatty composition.

In general, emulsifiers are amphiphilic molecules that concentrate at the interface between two phases and modify the properties of that interface. Suitable non-limiting examples of emulsifiers are described in MCCUTCHEON'S EMULSIFIERS & DETERGENTS OR THE INDUSTRIAL SURFACTANTS HANDBOOK. Some specific non-limiting examples of emulsifiers include lecithins, polyoxyethene, stearates, polysorbate 20, sorbitan derivatives (polysorbate 20, polysorbate 80, polysorbate 40, polysorbate 60, and polysorbate 65), mixed ammonium salts of phosphorylated glycerides, enzymatically hydrolyzed carboxymethyl-cellulose, mono- and diglycerides of fatty acids, esters of mono- and diglycerides of fatty acids (such as acetic acid esters, lactic acid esters, citric acid esters, tartaric acid esters, mono- and diacetyl tartaric acid esters, mixed acetic and tartaric acid esters), succinylate monoglycerides, sucrose esters of fatty acids, sucroglycerides, polyglycerol esters of fatty acids, polyglycerol polyricinoleate, propane-1,2-diol esters of fatty acids, propylene glycol esters of fatty acids, lactylated fatty acid esters of glycerol and propanol, thermally oxidized soya bean oil interacted with mono- and diglycerides of fatty acids, sodium stearoyl lactylate, calcium stearoyl lactylate, stearyl tartrate, stearyl citrate, sodium stearoyl fumarate, calcium stearoyl fumarate, sodium dodecyl sulfate, ethoxylated mono- and di-glycerides, methyl glucoside-coconut oil ester, sorbitan monostearate, sorbitan tristearate, sorbitan monolaurate, sorbitan monooleate, sorbitan monopalmitate, sorbitan trioleate, and combinations thereof.

In some embodiments, the emulsifier comprises lecithins (such as mixtures of glycerophospholipids, including phosphatidylcholine PC, phosphatidylethanolamine PE, phosphatidylinositol PI, and phosphatidic acid PA) with different triglyceride content (pure lecithins or deoiled lecithins, different ratio PC-to-PE-to-PI). Such lecithins can be used in any suitable form, including in the form of oily paste or powders. Lecithins are commercially available from a number of suppliers including Cargill (brands EMELPUR, EMULTOP, LECIMULTHIN, EPIKURON), Archer Daniels Midland (brand ULTRALEC, ADLEC), Solae (brand SOLEC), and Bunge (brand BUNGEMAXX).

Suitable emulsifiers can be characterized according to their hydrophilic-lipophilic balance (HLB), measured on an empirical scale set forth in Griffin, J. COSMET. CHEM., vol. 1, p. 311 (1949). This scale ranges from 0 to 20, with 0 for a completely lipophilic molecule and 20 for a completely hydrophilic molecule. The function of surfactants can be generally described by their HLB number. Defoaming surfactants have an HLB range of 1-3. Water-in-oil emulsifiers have an HLB range of 3-6. Wetting agents have an HLB range of 7-9. Oil-in-water emulsifiers have an HLB range of 8-18. Detergents have an HLB range of 13-15. Solubilizers have an HLB range of 15-18.

In some embodiments, the emulsifier present in the fatty composition has an HLB value of no more than 10, of no more than 9, or of no more than 8, or of no more than 7, or of no more than 6. In some embodiments, the emulsifier present in the fatty composition has an HLB value ranging from 3 to 9, or from 4 to 9, or from 5 to 9, or from 6 to 9, or from 7 to 9, or from 3 to 8, or from 3 to 7, or from 3 to 6. Such emulsifiers may be referred to as low-HLB emulsifiers.

Non-limiting examples of the low-HLB emulsifiers suitable to form water-in-oil emulsion include, alcohol alkoxylates, alkylamine alkoxylates, polyetheramine alkoxylates, ethylene oxide/propylene oxide block polymers, phosphate esters, alkyl sulfates, alkyl ether sulfates, alkyl and alkylbenzene sulfonates, fatty acid esters, fatty oil alkoxylates, saccharide derivatives, sorbitan derivatives, alkyl phenol alkoxylates, arylphenol alkoxylates, sulphosuccinates, sulphosuccinamates, and any combinations thereof. The emulsifiers can be nonionic, anionic, cationic or zwitterionic. In some embodiments, the emulsifiers are suitable for use in foods, pet foods, or feed products, including, but not limited to fatty acid esters, saccharide derivatives, sorbitan derivatives, especially sorbitan esters, mono/diglyceride, citric acid esters, lecithin and other phospholipids, and combinations thereof. Commercial examples of such low-HLB emulsifiers include, but are not limited to, the DIMODAN emulsifiers (distilled monoglycerides) available from DuPont-Danisco, CITREM (citric acid esters of mono- and diglycerides) available from Paalsgard, SOLEC (soy lecithin) available from DuPont Nutrition, or GRINSTED STS/SMS (sorbitan esters) also available from DuPont Nutrition.

In some embodiments thereof, the fatty composition comprises fat-soluble flavor compounds, such as fat-soluble aroma compounds. Such fat-soluble flavor compounds can be present in the fatty composition in any suitable amount. For example, in some embodiments, the fat-soluble flavor compounds make up from 0.1% by weight to 80% by weight, or from 1% by weight or from 60% by weight, of the fatty composition, based on the total weight of the fatty composition.

Any suitable fat-soluble flavor compounds can be used, according to those known in the relevant art. Flavor compounds are discussed in further detail below.

As noted above, the fatty compositions are typically included in an water-in-oil emulsion, such that the continuous phase comprises the fatty composition and the dispersed phase comprises the aqueous medium. The fatty composition can have any suitable characteristics, according to the embodiments set forth in the preceding section of this disclosure. The aqueous medium comprises water. For example, in some embodiments, water makes up at least 75% by weight, or at least 80% by weight, or at least 85% by weight, or at least 90% by weight, or at least 95% by weight, or at least 97% by weight, or at least 99% by weight, of the aqueous medium, based on the total weight of aqueous medium. In some further embodiments, the aqueous medium comprises water-soluble flavor compounds.

As used herein, the term "emulsion" refers to a mixture of two or more liquids that are normally immiscible (i.e., not mixable). In an emulsion, one liquid (the dispersed phase) is dispersed in the other (the continuous phase). In certain instances, one of the phases is a hydrophobic or lipophilic phase, and the other phase is a hydrophilic phase. In certain embodiments disclosed herein, the emulsion is a water-in oil emulsions, which comprises a continuous hydrophobic (i.e., lipophilic) phase in which the hydrophilic phase is dispersed.

The emulsion can be any type of emulsion. For example, in some embodiments, the emulsion is a macroemulsion, a microemulsion, or a nanoemulsion.

The emulsions disclosed herein may be prepared by any suitable procedure. For example, in some embodiments, the emulsion is prepared by applying mechanical force to emulsify the disperse phase droplets, such as by mechanical mixing with a high shear blender, a colloidal mill, an impeller mixer, or by the use of a high-pressure homogenizer. In some embodiments, such emulsions are prepared by ultrasound processing, by phase inversion emulsification, by membrane emulsification, or by emulsification using microfluidic channels.

The emulsion can have any suitable weight ratio between the continuous phase and the dispersed phase. For example, in some embodiments, the continuous phase makes up from 30% by weight to 99% by weight, or from 35% by weight to 98% by weight; or from 38% by weight to 97% by weight, or from 40% by weight to 95% by weight, or from 45% by weight to 93% by weight, of the emulsion, based on the total weight of the emulsion. In certain related embodiments, the dispersed phase makes up from 0.1% by weight to 50% by weight, or from 3% by weight to 45% by weight, or from 5% by weight to 40% by weight, or from 8% by weight to 30% by weight, of the emulsion, based on the total weight of the emulsion.

In some embodiments, the aqueous medium comprises soluble fiber. In such embodiments, the soluble fiber can be present in any suitable concentration. For example, in some embodiments, the soluble fiber is present in the aqueous medium at a concentration ranging from 0.1% by weight to 5% by weight, or from 1% by weight to 2% by weight, based on the total weight of the aqueous medium. In some embodiments, the soluble fiber is present at a concentration suitable for forming a hydrogel when the emulsion is heated above room temperatures, such as standard temperatures for cooking meat.

As used herein, the term "soluble fiber" refers to polysaccharides that are soluble in water, such as according to the method set forth in Prosky et al, J. Assoc. Anal. Chem., vol. 70 (5), p. 1017 (1988). Such fibers can include fibers from a variety of sources. Some non-limiting examples of suitable fibers include fruit fiber, grain fiber, natural soluble fiber, and synthetic soluble fiber. Natural soluble fiber includes soluble corn fiber, maltodextrin, acacia, and hydrolyzed guar gum. Synthetic soluble fibers include polydextrose, modified food starch, and the like. Food grade sources of soluble fiber useful in embodiments of the present disclosure include inulin, corn fiber, barley, corn germ, ground oat hulls, milled corn bran, derivatives of the aleurone layer of wheat bran, flax flour, whole flaxseed bran, winter barley flake, ground course kilned oat groats, maize, pea fiber (e.g. Canadian yellow pea), Danish potato fiber, konjac vegetable fiber, psyllium fiber (e.g., from seed husks of planago ovate), psyllium husk fiber, liquid agave fiber, rice bran fiber, oat sprout fibers, amaranth sprout fiber, lentil flour fiber, grape seed fiber, apple fiber, blueberry fiber, cranberry fiber, fig fiber, ciranda power fiber, carob powder fiber, milled prune fiber, mango fiber, orange fiber, orange pulp, strawberry fiber, carrageenan hydrocolloid, derivatives of eucheuma cottonnil seaweed, cottonseed fiber, soya fiber, kiwi fiber, acacia gum fiber, bamboo fiber, chia fiber, potato fiber, potato starch, pectin (carbohydrate) fiber, hydrolyzed guar gum, carrot fiber, soy fiber, chicory root fiber, oat fiber, wheat fiber, tomato fiber, polydextrose fiber, refined corn starch syrup, isomalto-oligosaccharide mixtures, soluble dextrin, mixtures of citrus bioflavonoids, cell-wall broken nutritional yeast, lipophilic fibers, prune juice, derivatives from larch trees, olygose fiber, derivatives from cane sugar, short-chain fructooligosaccharides, synthetic polymers of glucose, polydextrose, pectin, polanion compounds, cellulose fibers, cellulose fibers derived from hard wood plants and carboxymethyl cellulose.

In some embodiments, the aqueous medium comprises water-soluble flavor compounds. Any suitable water-soluble flavor compounds can be used, according to those known in the relevant art. Flavor compounds are discussed in further detail below.

In some cases, it may be desirable to describe the resulting emulsion in terms of particular physical characteristics. For example, in some embodiments, the emulsion is a water-in-oil emulsion having an elastic shear modulus G' (0.3%, 0.5 Hz) higher than its viscous shear modulus G" (0.3%, 0.5 Hz). Using this notation, the numbers provided in brackets refer to the strain amplitude given in percent values, and the frequency of the oscillatory shearing, meaning that values given refer to the shear modulus measured using shear oscillations performed at a frequency of 0.5 Hz and a strain amplitude of 0.3%. The elastic shear modulus represents the elastic behavior of a material for a given frequency and strain amplitude, and is conventionally written as G' and measured in units of Pascal (Pa). The viscous shear modulus represents the viscous behavior of a material for a given frequency and strain amplitude, and is conventionally written as G" and also measured in units of Pascal (Pa). These characteristic values are, for example, defined in R. G. Larson, The Structure and Rheology Complex Fluids (1998) or F. A. Morrison, Understanding Rheology (2001).

These viscoelastic properties are measured during dynamic tests under oscillating shear strains (small deformations) performed at a constant temperature or between range of temperatures, for example at temperatures ranging from 4° C. to 80° C., and at a constant frequency (i.e., 0.5 Hz) or a frequency range on a rheometer (for example, a Model DHR-2, TA Instruments) under a torsional/shear strain (i.e., a sinusoidally varying shear strain with a strain amplitude of 0.3% and a frequency of 0.5 Hz), or a range of torsional/shear strains, for example testing a range of oscillatory shear strains with amplitudes ranging from 0.1% to 100%, for example, in cone-plate geometry (for example with a 40 mm diameter cone/plate geometry and a 2 degree cone angle). Such methods are further described in P. Fischer et al., "Rheology of Food Materials", in Current Opinion in Colloid & Interface Science, vol. 16(1), pp. 36-40 (2011). For example, G' (0.3%, 0.5 Hz) is the elastic shear modulus of a material, measured at a frequency of 0.5 Hz and at a torsional/shear stress of 0.3%, for a temperature from 5° C. to 80° C. G' (18° C., 0.5 Hz) is the elastic shear modulus of a material, measured at a frequency of 0.5 Hz and at a temperature of 18° C., for any torsional/shear stress from 0.1% to 100%. G" (0.3%, 0.5 Hz) is the viscous shear modulus of a material, measured at a frequency of 0.5 Hz and at a torsional/shear stress of 0.3%, for any temperature from 5° C. to 80° C.

In some embodiments, the emulsions disclosed herein have an elastic shear modulus G' (0.5 Hz, 37° C.) higher than the viscous shear modulus G" (0.5 Hz, 37° C.) at a shear strain lower than 8%, or lower than 7%, or lower than 5%. In some embodiments, the emulsions disclosed herein have a ratio G' (0.3%, 0.5 Hz)/G' (0.3%, 0.5 Hz) of no more than 20, or no more than 15, or no more than 10, or no more than 5, or no more than 3, or no more than 2, or no more than 1, or no more than 0.5. In some embodiments, the emulsions disclosed herein have a ratio G' (0.3%, 0.5 Hz)/G' (0.3%, 0.5 Hz) of at least 0.001, or at least 0.01, or at least 0.05. In some embodiments, the emulsions disclosed herein have a ratio G'/G" (0.5 Hz, 18° C.) of no more than 1. In some embodiments, the emulsions disclosed herein have a ratio G'/G" (0.5 Hz, 18° C.) of at least 0.01.

The dispersed phase generally forms drops in the emulsion. The drop size can be any suitable size, depending on various factors. In some embodiments, the emulsions have a drop size having an average diameter of ranging from 0.1 μm to 30 μm, or from 0.8 μm to 20 μm, or from 2 μm to 10 μm. The drop size can be measured via any well-established method that allows measurements which are accurate within an experimental error of 5% at the most and preferably below 1%. Suitable well-established methods use light microscopy (for example, R. J. Hunter, Introduction to Modern Colloid Science (1994)). In some instances, the drop size distribution can be measured by image analysis using the software of the light microscope (Nikon Eclipse Software) of a sample diluted in heated isopropyl myristate. The term "average" refers to an arithmetic mean.

The emulsions disclosed herein can, in certain embodiments, contain other additives, adjuvants, and the like, that are commonly included in food products, pet food products, and feed products. For example, the emulsions disclosed herein can, in certain embodiments, comprise any additional ingredients or combination of ingredients as are commonly used in comestible products, including, but not limited to:

acids, including, for example citric acid, phosphoric acid, ascorbic acid, sodium acid sulfate, lactic acid, or tartaric acid;

bitter ingredients, including, for example caffeine, quinine, green tea, catechins, polyphenols, green robusta coffee extract, green coffee extract, potassium chloride, menthol, or proteins (such as proteins and protein isolates derived from plants, algae, or fungi);

coloring agents, including, for example caramel color, Red #40, Yellow #5, Yellow #6, Blue #1, Red #3, purple carrot, black carrot juice, purple sweet potato, vegetable juice, fruit juice, beta carotene, turmeric curcumin, or titanium dioxide;

preservatives, including, for example sodium benzoate, potassium benzoate, potassium sorbate, sodium metabisulfate, sorbic acid, or benzoic acid;

antioxidants including, for example ascorbic acid, calcium disodium EDTA, alpha tocopherols, mixed tocopherols, rosemary extract, grape seed extract, resveratrol, or sodium hexametaphosphate;

vitamins or functional ingredients including, for example resveratrol, Co-Q10, omega 3 fatty acids, theanine, choline chloride (citocoline), fibersol, inulin (chicory root), taurine, panax ginseng extract, guanana extract, ginger extract, L-phenylalanine, L-carnitine, L-tartrate, D-glucoronolactone, inositol, bioflavonoids, Echinacea, ginko biloba, yerba mate, flax seed oil, garcinia cambogia rind extract, white tea extract, ribose, milk thistle extract, grape seed extract, pyrodixine HCl (vitamin B6), cyanoobalamin (vitamin B12), niacinamide (vitamin B3), biotin, calcium lactate, calcium pantothenate (pantothenic acid), calcium phosphate, calcium carbonate, chromium chloride, chromium polynicotinate, cupric sulfate, folic acid, ferric pyrophosphate, iron, magnesium lactate, magnesium carbonate, magnesium sulfate, monopotassium phosphate, monosodium phosphate, phosphorus, potassium iodide, potassium phosphate, riboflavin, sodium sulfate, sodium gluconate, sodium polyphosphate, sodium bicarbonate, thiamine mononitrate, vitamin D3, vitamin A palmitate, zinc gluconate, zinc lactate, or zinc sulphate;

- clouding agents, including, for example ester gun, brominated vegetable oil (BVO), or sucrose acetate isobutyrate (SAIB);
- buffers, including, for example sodium citrate, potassium citrate, or salt;
- flavors, including, for example propylene glycol, ethyl alcohol, glycerine, gum Arabic (gum acacia), maltodextrin, modified corn starch, dextrose, natural flavor, natural flavor with other natural flavors (natural flavor WONF), natural and artificial flavors, artificial flavor, silicon dioxide, magnesium carbonate, or tricalcium phosphate; or
- starches and stabilizers, including, for example pectin, xanthan gum, carboxylmethylcellulose (CMC), polysorbate 60, polysorbate 80, medium chain triglycerides, cellulose gel, cellulose gum, sodium caseinate, modified food starch, gum Arabic (gum acacia), inulin, or carrageenan.

One example of an additional ingredient includes free fatty acids. Suitable examples include stearic acid, palmitic acid, myristic acid, lauric acid, capric acid, caprylic acid, and the like. These free fatty acids can be present at any suitable concentration. For example, in some embodiments, free fatty acids are present at a concentration ranging from 3% by weight to 20% by weight, or from 5% by weight to 18% by weight, or from 7% by weight to 16% by weight, in the emulsion, based on the total weight of the emulsion.

Other acids can also be present, for example, to help adjust the pH of the final product. Suitable acids for this purpose include comestible acids, such as lactic acid, citric acid, and combinations thereof. Such acids can be present at any concentration. For example, in some embodiments, free fatty acids are present at a concentration ranging from 0.2% by weight to 3.0% by weight, or from 0.5% by weight to 2.0% by weight, or from 0.7% by weight to 1.8% by weight, in the emulsion, based on the total weight of the emulsion.

Further features of such emulsions and their method of preparation are set forth in PCT Publication No. WO 2020/260628, which is hereby incorporated by reference.

Leghemoglobin Compounds or Iron Salts

The comestible compositions provided herein comprise a heme-containing protein or an iron salt.

In some embodiments, the comestible composition comprises a heme-containing protein. As used herein, the term "heme containing protein" includes any polypeptide covalently or noncovalently bound to a heme moiety. In some embodiments, the heme-containing polypeptide is a globin and can include a globin fold, which comprises a series of seven to nine alpha helices. Globin type proteins can be of any class (for example, class I, class II, or class III), and in some embodiments, can transport or store oxygen. For example, a heme-containing protein can be a non-symbiotic type of hemoglobin or a leghemoglobin. A heme-containing polypeptide can be a monomer, such as a single polypeptide chain, or can be a dimer, a trimer, tetramer, and/or higher order oligomer. The lifetime of the oxygenated $Fe^{2+}$ state of a heme-containing protein can be similar to that of myoglobin or can exceed it by 10%, or 20%, or 30%>, or 40%, or 50%, or even 100%. or more under conditions in which the heme-protein-containing consumable is manufactured, stored, handled or prepared for consumption.

Non-limiting examples of heme-containing proteins include an androglobin, a cytoglobin, a globin E, a globin X, a globin Y, a hemoglobin, a myoglobin, an erythrocruorin, a beta hemoglobin, an alpha hemoglobin, a protoglobin, a cyanoglobin, a cytoglobin, a histoglobin, a neuroglobins, a chlorocruorin, a truncated hemoglobin (e.g., HbN or HbO), a truncated 2/2 globin, a hemoglobin 3 (e.g., Glb3), a cytochrome, or a peroxidase.

Heme-containing proteins that can be used in the comestible compositions described herein and can be from mammals (for example, farm animals such as cows, goats, sheep, pigs, ox, or rabbits), birds, plants, algae, fungi (for example, yeast or filamentous fungi), ciliates, or bacteria. For example, a heme-containing protein can be from a mammal such as a farm animal (e.g., a cow, goat, sheep, pig, fish, ox, or rabbit) or a bird such as a turkey or chicken. Heme-containing proteins can be from a plant such as *Nicotiana tabacum* or *Nicotiana sylvestris* (tobacco); *Zea mays* (corn), *Arabidopsis thaliana*, a legume such as *Glycine max* (soybean), *Cicer arietinum* (garbanzo or chick pea), *Pisum sativum* (pea) varieties such as garden peas or sugar snap peas, *Phaseolus vulgaris* varieties of common beans such as green beans, black beans, navy beans, northern beans, or pinto beans, *Vigna unguiculata* varieties (cow peas), *Vigna radiata* (mung beans), *Lupinus albus* (lupin), or *Medicago sativa* (alfalfa); *Brassica napus* (canola), *Triticum* sps. (wheat, including wheat berries, and spelt); *Gossypium hirsutum* (cotton); *Oryza sativa* (rice); *Zizania* sps. (wild rice); *Helianthus annuus* (sunflower); *Beta vulgaris* (sugarbeet); *Pennisetum glaucum* (pearl millet); *Chenopodium* sp. (quinoa); *Sesamum* sp. (sesame); *Linum usitatissimum* (flax); or *Hordeum vulgare* (barley). Heme-containing proteins can be isolated from fungi such as *Saccharomyces cerevisiae, Pichia pastoris, Magnaporthe oryzae, Fusarium graminearum, Aspergillus oryzae, Trichoderma reesei, Myceliopthera thermophile, Kluyveramyces lactis*, or *Fusarium oxysporum*. Heme-containing proteins can be isolated from bacteria such as *Escherichia coli, Bacillus subtilis, Bacillus licheniformis, Bacillus megaterium, Synechocistis* sp., *Aquifex aeolicus, Methylacidiphilum infernorum*, or thermophilic bacteria such as *Thermophilus* spp. The sequences and structure of numerous heme-containing proteins are known. See, for example, Reedy, et al, Nucleic Acids Research, 2008, Vol. 36, Database issue D307-D313 and the Heme Protein Database available on the world wide web at http://hemeprotein.info/heme.php.

In some embodiments, a non-symbiotic hemoglobin can be from any plant. In some embodiments, a non-symbiotic hemoglobin can be from a plant selected from the group consisting of soybean, sprouted soybean, alfalfa, golden flax, black bean, black eyed pea, northern bean, tobacco, pea, garbanzo, moong bean, cowpeas, pinto beans, pod peas, quinoa, sesame, sunflower, wheat berries, spelt, barley, wild rice, and rice.

In some embodiments, the heme-containing protein is a leghemoglobin, such as a soy, pea, or cowpea leghemoglobin.

In some embodiments, isolated plant proteins are used. As used herein, the term "isolated" with respect to a protein or a protein fraction (for example, a 7S fraction) indicates that the protein or protein fraction has been separated from other components of the source material (for example, other animal, plant, fungal, algal, or bacterial proteins), such that the protein or protein fraction is at least 2% (for example, at least 5%, or at least 10%, or at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, or at least 90%, or at least 95%, or at least 99%) free, by dry weight, of the other components of the source material. Thus, in some embodiments, the heme-containing protein (e.g., a plant heme-containing protein) is isolated. Proteins can be separated on the basis of their molecular weight, for example, by size exclusion chromatography, ultrafiltration through membranes, or density centrifugation. In some embodiments, the proteins can be separated based on their surface charge, for example, by isoelectric precipitation, anion exchange chromatography, or cation exchange chromatography. Proteins also can be separated on the basis of their solubility, for example, by ammonium sulfate precipitation, isoelectric precipitation, surfactants, detergents or solvent extraction. Proteins also can be separated by their affinity to another molecule, using, for example, hydrophobic interaction chromatography, reactive dyes, or hydroxyapatite. Affinity chromatography also can include using antibodies having specific binding affinity for the heme-containing protein, nickel nitroloacetic acid (NTA) for His-tagged recombinant proteins, lectins to bind to sugar moieties on a glycoprotein, or other molecules which specifically binds the protein.

In some embodiments, the isolated protein is decolorized. For example, the RuBisCO concentrates can be decolorized (pH 7-9) by passing over columns packed with activated carbon. The colorants can bind to the column while RuBisCO can be isolated in the filtrate. Alternatively, RuBisCO concentrates can be decolorized by incubating the solution with a FPX66 (Dow Chemicals) resin packed in a column or batch mode. The slurry is incubated for 30 minutes and then the liquid is separated from the resin. The colorants can bind to the resin and RuBisCO can be collected in the column flow-through. See also U.S. Patent Application Publication Nos. 2017/0298337, 2017/0321203, and 2017/0321204.

In some embodiments, a decolorized isolated plant protein can provide an increased shelf-life stability to the red color of the comestible composition as compared to a corresponding comestible composition including an isolated plant protein without decolorization. In some embodiments, the decolorized protein can lead to an improved flavor profile of the comestible composition as compared to that observed in a comestible composition with the corresponding isolated plant protein without decolorization.

Heme-containing or other proteins also can be recombinantly produced using polypeptide expression techniques (e.g., heterologous expression techniques using bacterial cells, insect cells, fungal cells such as yeast, plant cells such as tobacco, soybean, or *Arabidopsis*, or mammalian cells). For example, leghemoglobin can be recombinantly produced in *E. coli* or *Pichia pastoris*. In some cases, standard polypeptide synthesis techniques (such as liquid-phase polypeptide synthesis techniques or solid-phase polypeptide synthesis techniques) can be used to produce heme-containing proteins synthetically. In some cases, in vitro transcription-translation techniques can be used to produce heme-containing proteins.

In some embodiments, the comestible composition comprises an iron salt, either alone or in combination with the heme-containing protein. The iron salt can be iron gluconate, iron chloride, iron oxalate, iron nitrate, iron citrate, iron ascorbate, ferrous sulfate, ferric pyrophosphate, or any other aqueous soluble salt.

The heme-containing proteins or iron salts can be used at any suitable concentration. Examples are set forth in PCT Publication No. WO 2015/153666, which is incorporated herein by reference.

Additional Ingredients

In certain embodiments, the comestible composition comprises certain additional ingredients to improve its flavor, texture, and the like.

In addition to the soluble fibers mentioned above, the comestible composition can also include certain fibers, such as insoluble fibers, that can provide structure and texture to the comestible composition. Any suitable insoluble fiber can be used. In some embodiments, the insoluble fiber is a plant-derived fiber. Non-limiting examples include nut fibers, grain fibers, rice fibers, seed fibers, oat fibers, pea fibers, potato fibers, berry fibers, soybean fibers, banana fibers, citrus fibers, apple fibers, and carrot fibers. In some embodiments, the insoluble fiber is pea fiber. The insoluble fiber can make up any suitable proportion of the fiber blend. For example, in some embodiments, the fiber blend comprises from 5 percent by weight to 50 percent by weight, or from 5 percent by weight to 40 percent by weight, or from 5 percent by weight to 30 percent by weight, or from 5 percent by weight to 20 percent by weight, based on the total weight of the comestible composition.

In certain aspects, the comestible composition comprises a non-animal protein, such as a plant protein, an algal protein, or a mycoprotein. In some embodiments, the comestible composition comprises a plant-based protein. Non-limiting examples of plant proteins include pea protein, soy protein, almond protein, cashew protein, canola (rapeseed) protein, chickpea protein, fava protein, sunflower protein, wheat protein, oat protein, and potato protein.

In some embodiments, the comestible compositions disclosed herein comprise a flavoring. In general, the flavoring improves the taste and flavor of the comestible composition or the resulting flavored product in which the comestible composition is used. Such improvement includes reducing the bitterness of the comestible composition or the resulting flavored product, reducing the perception of astringency of the comestible composition or the resulting flavored product, reducing the perception of green taste notes (such as pea taste) of the comestible composition or the resulting flavored product, reducing the perception of cereal notes of the comestible composition or the resulting flavored product, improving the perception of creaminess of the comestible composition or the resulting flavored product, improving the perception of creaminess of the comestible composition or the resulting flavored product, improving the perception of fattiness of the comestible composition or the resulting flavored product, improving the perception of sweetness of the comestible composition or the resulting flavored product, improving the perception of savory taste (umami or kokumi) of the comestible composition or the resulting flavored product, improving the mouthfeel or mouthcoating of the comestible composition or the resulting flavored product, improving the perception of juiciness of the comestible composition or the resulting flavored product, improving the perception of thickness of the comestible composition or the resulting flavored product, improving the vanillic character of the comestible composition or the resulting flavored product, or any combination thereof.

Any suitable flavoring can be used. In some embodiments, the flavoring comprises synthetic flavor oils and flavoring aromatics or oils, oleoresins and extracts derived from plants, leaves, flowers, fruits, and so forth, or combinations thereof. Non-limiting examples of flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Non-limiting examples of other flavors include natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, watermelon, apricot, banana, melon, apricot, ume, cherry, raspberry, blackberry, tropical fruit, mango, mangosteen, pomegranate, papaya and so forth. Other potential flavors include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. In the context of dairy or dairy analog products, the most commonly used flavor agents are agents that impart flavors such as vanilla, French vanilla, chocolate, banana, lemon, hazelnut, coconut, almond, strawberry, mocha, coffee, tea, chai, cinnamon, caramel, cream, brown sugar, toffee, pecan, butter pecan, toffee, Irish crème, white chocolate, raspberry, pumpkin pie spice, peppermint, or any combination thereof.

In some embodiments, the flavoring is a meat flavoring, or other flavorings commonly used in the context of savory products. Such flavorings include glutamates, arginates, avocadene, avocadyne, a purine ribonucleitide (such as inosine monophosphate (IMP), guanosine monophosphate (GMP), hypoxanthine, inosine), a yeast extract, a fermented food product, cheese, garlic or extracts thereof, a gamma-glutamyl-containing polypeptide, a gamma-glutamyl-containing oligopeptide (such as gamma-glutamyl-containing tripeptides); an flavor-modifying composition (such as a cinnamic acid amide or a derivative thereof), a nucleotide, an oligonucleotide, a plant extract, a food extract, or any combinations thereof.

In some embodiments, the flavoring comprises a yeast extract, such as a yeast lysate. Such extracts can be obtained from any suitable yeast strain, where such extracts are suitable for human consumption. Non-limiting examples of such yeasts include: yeasts of the genus *Saccharomyces*, such as *Saccharomyces cerevisiae* or *Saccharomyces pastorianus*; yeasts of the genus *Candida*, such as *Candida utilis*; yeasts of the genus *Kluyveromyces*, such as *Kluyveromyces lactis* or *Kluyveromyces marxianus*; yeasts of the genus *Pichia* such as *Pichia pastoris*; yeasts of the genus Debaryomyces such as *Debaryomyces hansenii*; and yeasts of the genus *Zygosaccharomyces* such as *Zygosaccharomyces mellis*. In some embodiments, the yeast is a yeast collected after brewing beer, sake, or the like. In some embodiments, the yeast is a yeast subjected to drying treatment (dried yeast) after collection.

Such extracts can be produced by any suitable means. In general, yeast extracts or lysates are made by extracting the contents of the yeast cells from the cell wall material. In many instances, the digestive enzymes in the cells (or additional enzymes added to the composition) break down the proteins and polynucleotides in the yeast to amino acids, oligopeptides (for example, from 2 to 10 peptides), nucleotides, oligonucleotides (from 2 to 10 nucleotides), and mixtures thereof. A yeast lysate can be prepared by lysing a yeast. For example, in some embodiments, the yeast after culture is crushed or lysed by an enzymatic decomposition method, a self-digestion method, an alkaline extraction method, a hot water extraction method, an acid decomposition method, an ultrasonic crushing method, crushing with a homogenizer, a freezing-thawing method, or the like (two or more thereof may be used in combination), whereby a yeast lysate is obtained. Yeast may be cultured by a conventional method. In some embodiments, the yeast after culture is heat-treated and then treated with a lytic enzyme to obtain an enzyme lysate. The conditions for the heat treatment are, for example, 80° C. to 90° C. for 5 minutes to 30 minutes. As the lytic enzyme used for the enzymatic decomposition method, various enzymes can be used as long as they can lyse the cell wall of yeast. The reaction conditions may be set so as to be optimum or suitable for the lytic enzyme(s) to be used, and specific examples thereof can include a temperature of 50° C. to 60° C., and a pH of 7.0 to 8.0. The reaction time is also not particularly limited, and can be, for example, 3 hours to 5 hours.

Compositions comprising yeast lysate can be obtained from a variety of commercial sources. For example, in some embodiments, the yeast lysate is provides by the flavoring additive sold under the name MODUMAX (DSM Food Specialties BV, Delft, Netherlands).

The flavoring also includes, in certain embodiments, one or more additional flavor-modifying compounds, such as compounds that enhance sweetness (e.g., phloretin, naringenin, glucosylated steviol glycosides, etc.), compounds that block bitterness, compounds that enhance umami, compounds that enhance kokumi, compounds that reduce sourness or licorice taste, compounds that enhance saltiness, compounds that enhance a cooling effect, compounds that enhance mouthfeel, or any combinations of the foregoing.

Thus, in some embodiments, the flavoring comprises one or more sweetness enhancing compounds. Such sweetness enhancing compounds include, but are not limited to, naturally derived compounds, such as hesperitin dihydrochalcone, hesperitin dihydrochalcone-4'-O'glucoside, neohesperitin dihydrochalcone, brazzein, hesperidin, phyllodulcin, naringenin, naringin, phloretin, glucosylated steviol glycosides, (2R,3R)-3-acetoxy-5,7,4'-trihydroxyflavanone, (2R,3R)-3-acetoxy-5,7,3'-trihydroxy-4'-methoxyflavanone, rubusosides, or synthetic compounds, such as any compounds set forth in U.S. Pat. Nos. 8,541,421; 8,815,956; 9,834,544; 8,592,592; 8,877,922; 9,000,054; and 9,000,051, as well as U.S. Patent Application Publication No. 2017/0119032. As used herein, the term "glucosylated steviol glycoside" refers to the product of enzymatically glucosylating natural steviol glycoside compounds. The glucosylation generally occurs through a glycosidic bond, such as an α-1,2 bond, an α-1,4 bond, an α-1,6 bond, a β-1,2 bond, a β-1,4 bond, a β-1,6 bond, and so forth. In some embodiments of any of the preceding embodiments, the comestible composition comprises 3-((4-amino-2,2-dioxo-1H-benzo[c][1,2,6]thiadiazin-5-yl)oxy)-2,2-dimethyl-N-propyl-propanamide or N-(1-((4-amino-2,2-dioxo-1H-benzo[c][1,2,6]thiadiazin-5-yl)oxy)-2-methyl-propan-2-yl)isonicotinamide.

In some further embodiments, the flavoring comprises one or more umami enhancing compounds. Such umami enhancing compounds include, but are not limited to, naturally derived compounds, or synthetic compounds, such as any compounds set forth in U.S. Pat. Nos. 8,735,081; 8,124,121; and 8,968,708. In some embodiments, the umami-enhancing compound is (2R,4R)-1,2,4-trihydroxy-heptadec-16-ene, (2R,4R)-1,2,4-trihydroxyheptadec-16-yne, or a mixture thereof. In some embodiments, the umami-enhancing compound is (3R,5S)-1-(4-hydroxy-3-methoxyphenyl)decane-3,5-diol diacetate. In some embodiments, the umami-enhancing compound is N-(heptan-4-yl)benzo[d][1,3]dioxole-5-carboxamide.

In some further embodiments, the flavoring comprises one or more cooling enhancing compounds. Such cooling enhancing compounds include, but are not limited to, naturally derived compounds, such as menthol or analogs thereof, or synthetic compounds, such as any compounds set forth in U.S. Pat. Nos. 9,394,287 and 10,421,727.

In some further embodiments, the flavoring comprises one or more bitterness blocking compounds. Such bitterness blocking compounds include, but are not limited to, naturally derived compounds, such as menthol or analogs thereof, or synthetic compounds, such as any compounds set forth in U.S. Pat. Nos. 8,076,491; 8,445,692; and 9,247,759. In some embodiments, the bitterness blocking compound is 3-(1-((3,5-dimethylisoxazol-4-yl)-methyl)-1H-pyrazol-4-yl)-1-(3-hydroxybenzyl)-imidazolidine-2,4-dione.

In some further embodiments, the flavoring comprises one or more sour taste modulating compounds.

In some further embodiments, the flavoring comprises one or more mouthfeel modifying compounds. Such mouthfeel modifying compounds include, but are not limited to, tannins, cellulosic materials, bamboo powder, and the like.

In some further embodiments, the flavoring comprises one or more flavor masking compounds. Such flavor masking compounds include, but are not limited to, cellulosic materials, materials extracted from fungus, materials extracted from plants, citric acid, carbonic acid (or carbonates), and the like.

In some embodiments, the flavor-modifying compounds described above are included to improve other tastants that may be present in the comestible composition itself, or that may be included within the flavored products that employ such compositions. Such tastants include sweeteners, umami tastants, kokumi tastants, bitter tastants, sour tastants, and the like.

For example, in some embodiments, the comestible composition or the resulting flavored product comprises a sweetener. The sweetener can be present in any suitable concentration, depending on factors such as the sweetener's potency as a sweetener, its solubility, and the like.

For example, in some embodiments, the sweetener is present in an amount from 0.1 weight percent to 12 weight percent. In some embodiments, the sweetener is present in an amount from 0.2% to 10% by weight. In some embodiments, the sweetener is present in an amount from 0.3% to 8% by weight. In some embodiments, the sweetener is present in an amount from 0.4% to 6% by weight. In some embodiments, the sweetener is present in an amount from 0.5% to 5% by weight. In some embodiments, the sweetener is present in an amount from 1% to 2% by weight. In some embodiments, the sweetener is present in an amount from 0.1% to 5% by weight. In some embodiments, the sweetener is present in an amount from 0.1% to 4% by weight. In some embodiments, the sweetener is present in an amount from 0.1% to 3% by weight. In some embodiments, the sweetener is present in an amount from 0.1% to 2% by weight. In some embodiments, the sweetener is present in an amount from 0.1% to 1% by weight. In some embodiments, the sweetener is present in an amount from 0.1% to 0.5% by weight. In some embodiments, the sweetener is present in an amount from 0.5% to 10% by weight. In some embodiments, the sweetener is present in an amount from 2% to 8% by weight. In some further embodiments of the embodiments set forth in this paragraph, the additional sweetener is sucrose, fructose (such as high-fructose corn syrup, fruit juice, and the like), glucose, xylitol, erythritol, glucose, allulose, or any combinations thereof. In some embodiments, the sweetener is sucrose.

In some other embodiments, the sweetener is present in an amount ranging from 10 ppm to 1000 ppm. In some embodiments, the sweetener is present in an amount from 20 ppm to 800 ppm. In some embodiments, the sweetener is present in an amount from 30 ppm to 600 ppm. In some embodiments, the sweetener is present in an amount from 40 ppm to 500 ppm. In some embodiments, the sweetener is present in an amount from 50 ppm to 400 ppm. In some embodiments, the sweetener is present in an amount from 50 ppm to 300 ppm. In some embodiments, the sweetener is present in an amount from 50 ppm to 200 ppm. In some embodiments, the sweetener is present in an amount from 50 ppm to 150 ppm. In some further embodiments of the embodiments set forth in this paragraph, the additional sweetener is a steviol glycoside (such as rebaudioside A, rebaudioside D, rebaudioside E, rebaudioside M, or any combination thereof), a mogroside (such as mogroside III, mogroside IV, mogroside V, siamenoside I, isomogroside V, mogroside $IV_E$, isomogroside IV, mogroside $III_E$, 11-oxomogroside V, the 1,6-α isomer of siamenoside I, and any combinations thereof), a derivative of either of the foregoing, such as glycoside derivatives (e.g., glucosylates), cyclamate, aspartame, sucralose, acesulfame K, or any combination thereof.

In general, the compositions and flavored products can include any suitable sweeteners or combination of sweeteners. In some embodiments, the sweetener is a common saccharide sweeteners, such as sucrose, fructose, glucose, and sweetener compositions comprising natural sugars, such as corn syrup (including high fructose corn syrup) or other syrups or sweetener concentrates derived from natural fruit and vegetable sources. In some embodiments, the sweetener is sucrose, fructose, or a combination thereof. In some embodiments, the sweetener is sucrose. In some other embodiments, the sweetener is selected from rare natural sugars including D-allose, D-psicose, L-ribose, D-tagatose, L-glucose, L-fucose, L-arbinose, D-turanose, and D-leucrose. In some embodiments, the sweetener is selected from semi-synthetic "sugar alcohol" sweeteners such as erythritol, isomalt, lactitol, mannitol, sorbitol, xylitol, maltodextrin, and the like. In some embodiments, the sweetener is selected from artificial sweeteners such as aspartame, saccharin, acesulfame-K, cyclamate, sucralose, and alitame. In some embodiments, the sweetener is selected from the group consisting of cyclamic acid, mogroside, tagatose, maltose, galactose, mannose, sucrose, fructose, lactose, allulose, neotame and other aspartame derivatives, glucose, D-tryptophan, glycine, maltitol, lactitol, isomalt, hydrogenated glucose syrup (HGS), hydrogenated starch hydrolyzate (HSH), stevioside, rebaudioside A, other sweet Stevia-based glycosides, chemically modified steviol glycosides (such as glucosylated steviol glycosides), mogrosides, chemically modified mogrosides (such as glucosylated mogrosides), carrelame and other guanidine-based sweeteners. In some embodiments, the additional sweetener is a combination of two or more of the sweeteners set forth in this paragraph. In some embodiments, the sweetener may combinations of two, three, four or five sweeteners as disclosed herein. In some embodiments, the additional sweetener is a sugar. In some embodiments, the additional sweetener is a combination of one or more sugars and other natural and artificial sweeteners. In some embodiments, the additional sweetener is a sugar. In some embodiments, the sugar is cane sugar. In some embodiments, the sugar is beet sugar. In some embodiments, the sugar may be sucrose, fructose, glucose or combinations thereof. In some embodiments, the sugar is sucrose. In some embodiments, the sugar is a combination of fructose and glucose.

In some embodiments, the sweeteners can also include, for example, sweetener compositions comprising one or more natural or synthetic carbohydrate, such as corn syrup, high fructose corn syrup, high maltose corn syrup, glucose syrup, sucralose syrup, hydrogenated glucose syrup (HGS), hydrogenated starch hydrolyzate (HSH), or other syrups or sweetener concentrates derived from natural fruit and vegetable sources, or semi-synthetic “sugar alcohol” sweeteners such as polyols. Non-limiting examples of polyols in some embodiments include erythritol, maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, isomaltulose, maltodextrin, and the like, and sugar alcohols or any other carbohydrates or combinations thereof capable of being reduced which do not adversely affect taste.

The sweetener may be a natural or synthetic sweetener that includes, but is not limited to, agave inulin, agave nectar, agave syrup, amazake, brazzein, brown rice syrup, coconut crystals, coconut sugars, coconut syrup, date sugar, fructans (also referred to as inulin fiber, fructo-oligosaccharides, or oligo-fructose), green stevia powder, *Stevia rebaudiana*, rebaudioside A, rebaudioside B, rebaudioside C, rebaudioside D, rebaudioside E, rebaudioside F, rebaudioside I, rebaudioside H, rebaudioside L, rebaudioside K, rebaudioside J, rebaudioside N, rebaudioside O, rebaudioside M and other sweet stevia-based glycosides, stevioside, stevioside extracts, honey, Jerusalem artichoke syrup, licorice root, luo han guo (fruit, powder, or extracts), lucuma (fruit, powder, or extracts), maple sap (including, for example, sap extracted from *Acer saccharum, Acer nigrum, Acer rubrum, Acer saccharinum, Acer platanoides, Acer negundo, Acer macrophyllum, Acer grandidentatum, Acer glabrum, Acer mono*), maple syrup, maple sugar, walnut sap (including, for example, sap extracted from *Juglans cinerea, Juglans nigra, Juglans ailatifolia, Juglans regia*), birch sap (including, for example, sap extracted from *Betula papyrifera, Betula alleghaniensis, Betula lenta, Betula nigra, Betula populifolia, Betula pendula*), sycamore sap (such as, for example, sap extracted from *Platanus occidentalis*), ironwood sap (such as, for example, sap extracted from *Ostrya virginiana*), mascobado, molasses (such as, for example, blackstrap molasses), molasses sugar, monatin, monellin, cane sugar (also referred to as natural sugar, unrefined cane sugar, or sucrose), palm sugar, panocha, piloncillo, rapadura, raw sugar, rice syrup, sorghum, sorghum syrup, cassava syrup (also referred to as tapioca syrup), thaumatin, yacon root, malt syrup, barley malt syrup, barley malt powder, beet sugar, cane sugar, crystalline juice crystals, caramel, carbitol, carob syrup, castor sugar, hydrogenated starch hydrolates, hydrolyzed can juice, hydrolyzed starch, invert sugar, anethole, arabinogalactan, arrope, syrup, P-4000, acesulfame potassium (also referred to as acesulfame K or ace-K), alitame (also referred to as aclame), advantame, aspartame, baiyunoside, neotame, benzamide derivatives, bernadame, canderel, carrelame and other guanidine-based sweeteners, vegetable fiber, corn sugar, coupling sugars, curculin, cyclamates, cyclocarioside I, demerara, dextran, dextrin, diastatic malt, dulcin, sucrol, valzin, dulcoside A, dulcoside B, emulin, enoxolone, maltodextrin, saccharin, estragole, ethyl maltol, glucin, gluconic acid, glucono-lactone, glucosamine, glucoronic acid, glycerol, glycine, glycyphillin, glycyrrhizin, glycyrrhetic acid monoglucuronide, golden sugar, yellow sugar, golden syrup, granulated sugar, gynostemma, hernandulcin, isomerized liquid sugars, jallab, chicory root dietary fiber, kynurenine derivatives (including N'-formyl-kynurenine, N'-acetyl-kynurenine, 6-chloro-kynurenine), galactitol, litesse, ligicane, lycasin, lugduname, guanidine, falernum, mabinlin I, mabinlin II, maltol, maltisorb, maltodextrin, maltotriol, mannosamine, miraculin, mizuame, mogrosides (including, for example, mogroside IV, mogroside V, and neomogroside), mukurozioside, nano sugar, naringin dihydrochalcone, neohesperidine dihydrochalcone, nib sugar, nigero-oligosaccharide, norbu, orgeat syrup, osladin, pekmez, pentadin, periandrin I, perillaldehyde, perillartine, petphyllum, phenylalanine, phlomisoside I, phlorodizin, phyllodulcin, polyglycitol syrups, polypodoside A, pterocaryoside A, pterocaryoside B, rebiana, refiners syrup, rub syrup, rubusoside, selligueain A, shugr, siamenoside I, siraitia grosvenorii, soybean oligosaccharide, Splenda, SRI oxime V, steviol glycoside, steviolbioside, stevioside, strogins 1, 2, and 4, sucronic acid, sucrononate, sugar, suosan, phloridzin, superaspartame, tetrasaccharide, threitol, treacle, trilobtain, tryptophan and derivatives (6-trifluoromethyl-tryptophan, 6-chloro-D-tryptophan), vanilla sugar, volemitol, birch syrup, aspartame-acesulfame, assugrin, and combinations or blends of any two or more thereof.

In still other embodiments, the sweetener can be a chemically or enzymatically modified natural high potency sweetener. Modified natural high potency sweeteners include glycosylated natural high potency sweetener such as glucosyl-, galactosyl-, or fructosyl-derivatives containing 1-50 glycosidic residues. Glycosylated natural high potency sweeteners may be prepared by enzymatic transglycosylation reaction catalyzed by various enzymes possessing transglycosylating activity. In some embodiments, the modified sweetener can be substituted or unsubstituted.

Additional sweeteners also include combinations of any two or more of any of the aforementioned sweeteners. In some embodiments, the sweetener may comprise combinations of two, three, four or five sweeteners as disclosed herein. In some embodiments, the sweetener may be a sugar. In some embodiments, the sweetener may be a combination of one or more sugars and other natural and artificial sweeteners. In some embodiments, the sweetener is a caloric sweetener, such as sucrose, fructose, xylitol, erythritol, or combinations thereof. In some embodiments, the comestible compositions are free (or, in some embodiments) substantially free of stevia-derived sweeteners, such as steviol glycosides, glucosylated steviol glycosides, or rebaudiosides. For example, in some embodiments, the comestible compositions are either free of stevia-derived sweeteners or comprise stevia-derived sweeteners in a concentration of no more than 1000 ppm, or no more than 500 ppm, or no more than 200 ppm, or no more than 100 ppm, or no more than 50 ppm, or no more than 20 ppm, or no more than 10 ppm, or no more than 5 ppm, or no more than 3 ppm, or no more than 1 ppm.

In some embodiments, the comestible composition comprises rebaudioside A and glucosylated steviol glycosides. The rebaudioside A can be present at any concentration such as those indicated above. The glucosylated steviol glycosides can be present at concentrations ranging from 1 ppm to 50 ppm, or from 1 ppm to 40 ppm, or from 1 ppm to 30 ppm, or from 1 ppm to 20 ppm, or from 1 ppm to 10 ppm. In some other embodiments, the rebaudioside A can be partially replaced by other steviol glycoside sweeteners, such as rebaudioside M.

In some embodiments, the comestible composition comprises an emulsifier, such as a non-hydrocolloid emulsifier. Any suitable non-hydrocolloid emulsifier can be used. For example, in some non-limiting embodiments, the emulsifier comprises lecithin, monoglycerides, diglycerides, polysorbates, vegetable oils, and the like. In some embodiments, the emulsifier comprises lecithin. The emulsifier can be present in any suitable concentration, which can be adjusted so as to form a stable emulsion of the other components in the comestible composition, for example, when incorporated into a flavored product.

In some instances, it may be desirable to include additives that assist in adjusting the viscosity of the comestible composition. Various salts and acids can be used to carry out such adjustments. In some embodiments, the comestible composition or the resulting flavored product comprises one or more salts. Non-limiting examples of suitable salts include magnesium sulfate, sodium chloride, sodium sulfate, calcium chloride, calcium sulfate, potassium sulfate, potassium chloride, potassium sorbate, potassium phosphate, potassium monophosphate, zinc chloride, zinc sulfate, or any mixtures thereof. In some embodiments, the comestible composition or the resulting flavored product also comprises one or more acids, which may be used alone or in combination with the aforementioned salts. Non-limiting examples of suitable acids include citric acid, lactic acid, acetic acid, tartaric acid, succinic acid, ascorbic acid, maleic acid, phosphoric acid, monopotassium phosphate, gluconic acid, glucono-lactone, glucoronic acid, glycyrrhetic acid, folic acid, pantothenic acid or mixtures thereof.

The comestible compositions can, in certain embodiments, comprise any additional ingredients or combination of ingredients as are commonly used in food and beverage products, including, but not limited to:

- acids, including, for example citric acid, phosphoric acid, ascorbic acid, sodium acid sulfate, lactic acid, or tartaric acid;
- bitter ingredients, including, for example caffeine, quinine, green tea, catechins, polyphenols, green robusta coffee extract, green coffee extract, potassium chloride, menthol, or proteins (such as proteins and protein isolates derived from plants, algae, or fungi);
- coloring agents, including, for example caramel color, Red #40, Yellow #5, Yellow #6, Blue #1, Red #3, purple carrot, black carrot juice, purple sweet potato, vegetable juice, fruit juice, beta carotene, turmeric curcumin, titanium dioxide, or beet juice;
- preservatives, including, for example sodium benzoate, potassium benzoate, potassium sorbate, sodium metabisulfate, sorbic acid, or benzoic acid;
- antioxidants including, for example ascorbic acid, calcium disodium EDTA, alpha tocopherols, mixed tocopherols, rosemary extract, grape seed extract, resveratrol, or sodium hexametaphosphate;
- vitamins or functional ingredients including, for example resveratrol, Co-Q10, omega 3 fatty acids, theanine, choline chloride (citocoline), fibersol, inulin (chicory root), taurine, panax ginseng extract, guanana extract, ginger extract, L-phenylalanine, L-carnitine, L-tartrate, D-glucoronolactone, inositol, bioflavonoids, Echinacea, ginko biloba, yerba mate, flax seed oil, garcinia cambogia rind extract, white tea extract, ribose, milk thistle extract, grape seed extract, pyrodixine HCl (vitamin B6), cyanoobalamin (vitamin B12), niacinamide (vitamin B3), biotin, calcium lactate, calcium pantothenate (pantothenic acid), calcium phosphate, calcium carbonate, chromium chloride, chromium polynicotinate, cupric sulfate, folic acid, ferric pyrophosphate, iron, magnesium lactate, magnesium carbonate, magnesium sulfate, monopotassium phosphate, monosodium phosphate, phosphorus, potassium iodide, potassium phosphate, riboflavin, sodium sulfate, sodium gluconate, sodium polyphosphate, sodium bicarbonate, thiamine mononitrate, vitamin D3, vitamin A palmitate, zinc gluconate, zinc lactate, or zinc sulphate;
- clouding agents, including, for example ester gun, brominated vegetable oil (BVO), or sucrose acetate isobutyrate (SAIB);
- buffers, including, for example sodium citrate, potassium citrate, or salt;
- propylene glycol, ethyl alcohol, glycerine, gum Arabic (gum acacia), modified corn starch, silicon dioxide, magnesium carbonate, or tricalcium phosphate; or
- starches and stabilizers, including, for example, polysorbate 60, polysorbate 80, medium chain triglycerides, and the like.

In some embodiments, the comestible composition can further comprise galacto-oligosaccharides, fructo-oligosaccharides, acacia fiber, soluble pea fiber, soluble wheat fiber, arabinoxylan, isomalto-oligosaccharides, xylo-oligosaccharides, and the like.

In some embodiments, the comestible composition further comprises a various carriers and adjuvants. Non-limiting examples of carriers include solvents, binders, bulking agents, or other inert medium, which is used in combination with the present compound and one or more optional adjuvants to form the formulation. For example, water or starch can be a carrier.

The term "adjuvant" denotes an additive that supplements, stabilizes, maintains, or enhances the intended function or effectiveness of the active ingredient, such as the compound of the present invention. In one embodiment, the at least one adjuvant comprises one or more flavoring agents. The flavoring agent may be of any flavor known to one skilled in the art or consumers, such as the flavor described above. In another embodiment, the adjuvant comprises one or more sweeteners. The one or more sweeteners can be any of the sweeteners described in this application. In another embodiment, the at least one adjuvant comprises one or more ingredients selected from the group consisting of a emulsifier, a stabilizer, an antimicrobial preservative, an antioxidant, vitamins, minerals, fats, starches, protein concentrates and isolates, salts, and combinations thereof. Examples of emulsifiers, stabilizers, antimicrobial preservatives, antioxidants, vitamins, minerals, fats, starches, protein concentrates and isolates, and salts are described in U.S. Pat. No. 6,468,576, the content of which is hereby incorporated by reference in its entirety for all purposes.

The comestible composition may further comprise a freezing point depressant, nucleating agent, or both as the at least one adjuvant. The freezing point depressant is an comestibly acceptable compound or agent which can depress the freezing point of a liquid or solvent to which the compound or agent is added. That is, a liquid or solution containing the freezing point depressant has a lower freezing point than the liquid or solvent without the freezing point depressant. In addition to depress the onset freezing point, the freezing point depressant may also lower the water activity of the flavored product. The examples of the freezing point depressant include, but are not limited to, carbohydrates, oils, ethyl alcohol, polyol, e.g., glycerol, and combinations thereof. The nucleating agent denotes an comestibly acceptable compound or agent which is able to facilitate nucleation. Examples of nucleating agents include, but are not limited to, calcium silicate, calcium carbonate, titanium dioxide, and combinations thereof.

Flavored Products

In certain aspects, the disclosure provides a flavored product, which comprises the comestible composition according to any of the embodiments set forth above. In some embodiments, the flavored product is a food product, such as a meat analogue product, for example, a non-animal-based ground beef replica. In some other embodiments, the flavored product is an animal feed product, such as pet food product. In such flavored products, the comestible composition can, in some embodiments, be used in combination with animal-based products to reduce the degree of animal fats or animal products in the comestible product. In other embodiments, the flavored products contain no animal-based products, such that the comestible composition is used to make an analogue or a replica of a meat product, such as a ground beef patty.

In some other embodiments, the flavored product is a meat-replacement product (or meat analogue), such as a product designed to mimic products traditionally made from red meat. For example, the flavored product can be a meat dough, such as those described in PCT Publication No. WO 2015/153666. Such flavored products can be designed to simulate beef products, such as ground beef (for making burgers) or cuts of beef for inclusion in soups, prepared meals, and the like. The flavored products can also be designed to simulate cuts or ground forms of other red meat, such as pork, goat, lamb, venison, and bison.

EXAMPLES

To further illustrate this invention, the following examples are included. The examples should not, of course, be construed as specifically limiting the invention. Variations of these examples within the scope of the claims are within the purview of one skilled in the art and are considered to fall within the scope of the invention as described, and claimed herein. The reader will recognize that the skilled artisan, armed with the present disclosure, and skill in the art is able to prepare and use the invention without exhaustive examples.

Example 1—Ground Beef Replica

Table 1 and Table 2 below sets forth formulas for ground beef replicas according to certain embodiments of the inventions set forth herein.

TABLE 1

| | Sample 1 | Sample 2 | Sample 3 |
|---|---|---|---|
| Water | 69 | 70 | 69 |
| Pea Protein[1] | 18 | 18 | 18 |
| Coconut Oil | 6.4 | 6.4 | 6.4 |
| Canola Oil | 3.0 | 3.0 | 3 |
| Methylcellulose | 1.3 | 1.3 | 1.3 |
| Caramel Color | 0.2 | 0.2 | 0.2 |
| Salt (NaCl) | 0.4 | 0.4 | 0.4 |
| Natural Flavor (Beef) | 0.5 | — | — |
| Natural Flavor (Hamburger) | 0.6 | 0.6 | 0.6 |
| Dynarome SR[2] | 0.4 | — | 0.6 |
| Dynarome TR[3] | — | 0.5 | 0.5 |

[1]The pea protein is Nutralys T70S (Roquette)

[2]Dynarome SR (Firmenich) is a water-in-oil emulsion composition according to the examples set forth in PCT Publication No. WO 2020/260628.

[3]Dynarome TR (Firmenich) is an oleaginous particle composition according to the examples set forth in PCT Publication No. WO 2021/104846.

TABLE 2

| | Sample 4 | Sample 5 | Sample 6 |
|---|---|---|---|
| Water | 58 | 59 | 58 |
| Pea Protein[4] | 20 | 20 | 20 |
| Pea Protein[5] | 1.5 | 1.5 | 1.5 |
| Coconut Oil | 10 | 10 | 10 |
| Canola Oil | 5.0 | 5.0 | 5.0 |
| Methylcellulose | 2.0 | 2.0 | 2.0 |
| Salt (NaCl) | 0.8 | 0.8 | 0.8 |
| Lactic Acid | 0.3 | 0.3 | 0.3 |
| Red Beet Color[6] | 0.3 | 0.3 | 0.3 |
| Brown Color[7] | 0.1 | 0.1 | 0.1 |
| Red Color[8] | 0.1 | 0.1 | 0.1 |
| Natural Flavor (Beef) | 0.5 | — | — |
| Natural Flavor (Hamburger) | 0.6 | 0.6 | 0.6 |
| Dynarome SR[9] | 0.6 | — | 0.6 |
| Dynarome TR[10] | — | 0.5 | 0.5 |

[4]The pea protein is Nutralys T70S (Roquette)

[5]The pea protein is Nutralys F85M (Roquette)

[6]Redbeet Red WSP (FruitMax)

[7]Brown 700 WSP (FruitMax)

[8]Red 101 WSP (FruitMax)

[9]Dynarome SR (Firmenich) is a water-in-oil emulsion composition according to the examples set forth in PCT Publication No. WO 2020/260628.

[10]Dynarome TR (Firmenich) is an oleaginous particle composition according to the examples set forth in PCT Publication No. WO 2021/104846.

The ground beef replicas are made my mixing all ingredients together with a mixer with a paddle attachment for about 2 minutes. Patties are then formed by taking about 100 grams of the mixed material and flattening the material to have a patty-like shape. The patties are then subjected to individual quick freezing (IQF) for 30 minutes and are stirred in a freezer. For each of the samples set forth above, iron-containing proteins or iron salts are added according to any of the embodiments set forth herein in suitable concentrations.

To cook the patties, each patty to be cooked is thawed overnight under refrigeration. I griddle is preheated at about 150° C. Each patty is cooked for 3-4 minutes on the preheated griddle until the internal temperature is about 75° C.

The invention claimed is:

1. A comestible composition, which comprises:

(a) a plurality of oleaginous particles, wherein the oleaginous particles comprise (i) a non-animal fat, a non-animal free fatty acid, or a combination thereof, and (ii) a flavor oil; and (b) a heme-containing protein or an iron salt; wherein the oleaginous particles have an average particle size ranging from 10 μm to 750 μm.

2. The comestible composition of claim 1, wherein the plurality of oleaginous particles are spray-dried particles.

3. The comestible composition of claim 1, wherein the oleaginous particles are extruded particles.

4. The comestible composition of claim 1, wherein the plurality of oleaginous particles comprise a non-animal fat.

5. The comestible composition of claim 4, wherein the non-animal fat is palm oil, palm kernel oil, coconut oil, cocoa butter, fractions of any of the foregoing, or any combinations thereof.

6. The comestible composition of claim 1, wherein the plurality of oleaginous particles comprises free fatty acid.

7. The comestible composition of claim 6, wherein the free fatty acid is capric acid, lauric acid, myristic acid, palmitic acid, stearic acid, oleic acid, linoleic acid, linolenic acid, eicosapentaenoic acid, docosahexaenoic acid, or any combinations thereof.

8. The comestible composition of claim 1, which comprises a heme-containing protein.

9. The comestible composition of claim 8, wherein the heme-containing protein is a leghemoglobin.

10. The comestible composition of claim 1, which comprises an iron salt.

11. The comestible composition of claim 10, wherein the iron salt is iron gluconate, iron chloride, iron oxalate, iron nitrate, iron citrate, iron ascorbate, ferrous sulfate, ferric pyrophosphate, or any combinations thereof.

12. A flavored product, which comprises the comestible composition of claim 1.

13. The flavored product of claim 12, wherein the flavored product is a ground beef replica.

14. The comestible composition of claim 1, wherein the oleaginous particles have an average particle size ranging from 50 μm to 750 μm.

* * * * *